US007052216B1

(12) United States Patent
Fields

(10) Patent No.: US 7,052,216 B1
(45) Date of Patent: May 30, 2006

(54) WORK SAVER FOR AN ELECTRIC DRILL

(76) Inventor: Robert M. Fields, 38826 White Plains Ave., Zephyrhills, FL (US) 33540

(*) Notice: Subject to any disclaimer, the term of this patent is extended or adjusted under 35 U.S.C. 154(b) by 0 days.

(21) Appl. No.: 11/032,956

(22) Filed: Jan. 11, 2005

(51) Int. Cl.
*B23B 35/00* (2006.01)
*B23B 45/14* (2006.01)
*B23B 47/18* (2006.01)

(52) U.S. Cl. ........................ 408/1 R; 408/92; 408/111; 408/129; 173/147

(58) Field of Classification Search ................ 408/1 R, 408/92, 110, 111, 129, 135, 712; 173/147
See application file for complete search history.

(56) References Cited

U.S. PATENT DOCUMENTS 683,794 A 10/1901 Politsch
2,362,929 A 11/1944 Richards
2,465,729 A 3/1949 Johnson et al.
2,821,872 A 2/1958 Salfer
2,947,205 A 8/1960 Wilson
3,741,670 A 6/1973 Wood
4,094,612 A 6/1978 Krieg
5,890,851 A 4/1999 Hamilton
2004/0202516 A1* 10/2004 Lanser ....................... 408/1 R

FOREIGN PATENT DOCUMENTS

DE 3927971 A1 * 2/1991

* cited by examiner

*Primary Examiner*—Boyer D. Ashley
*Assistant Examiner*—Ali Abdelwahed
(74) *Attorney, Agent, or Firm*—Larson & Larson, P.A.; Herbert W. Larson

(57) ABSTRACT

A T-bracket having a pair of spaced apart arms support a housing containing a sprocket wheel and a shaft to turn the sprocket. A handle attached to one end of the shaft turns the sprocket to tighten a chain turning on the sprocket teeth. A flexible wire rod is welded to the T-bracket and is juxtaposed around a rear end of a power drill. The chain is looped around a work piece and attached to a side of the drill opposite from the T-bracket. The handle is turned to tighten the chain and exert force on a drill bit being driven by the power drill.

14 Claims, 5 Drawing Sheets

WORK SAVER FOR AN ELECTRIC DRILL

BACKGROUND OF THE INVENTION

1. Field of the Invention

The present invention relates to a labor saving attachment to an electric drill. More specifically, it refers to an attachment to an electric drill having a sprocket operated by a handle to tighten a chain around a work object, the chain attached to the drill so that pressure is exerted on a drill bit without added pressure from the drill operator.

2. Description of the Prior Art

The size and weight of electric hand drills cause considerable fatigue to a user, particularly when a work post is a dense material such as metal pipe. U.S. Pat. No. 2,821,872 describes the use of a chain around an electric drill and a work piece to steady the drill. There is no way of increasing the pressure on the chain to reduce worker fatigue. In U.S. Pat. No. 5,890,851 hand drill pressure is increased using a lever to provide a mechanical advantage as the hand drill engages a work piece. A more effective device for increasing hand drill pressure mechanically is needed to reduce worker fatigue.

SUMMARY OF THE INVENTION

The present invention solves the problem of worker fatigue by providing an attachment to an electric power drill. The attachment is mounted on a side of the power drill and employs a flexible wire rod to fasten the attachment to a rear portion of the power drill. A T-shaped bracket is welded to the flexible wire rod on a side portion of the power drill. A pair of outwardly directed arms integral with the T-bracket have bores at their ends for receiving a shaft. The shaft drives a sprocket wheel within a housing and a handle turns the shaft at one end. A chain turned by the sprocket wheel is looped around a work piece and is attached at one end to the flexible wire rod along a side of the power tool opposite from the T-bracket. By turning the handle, the chain tightens around the work piece and forces the drill bit into the work piece with no additional force exerted by the power drill operator.

BRIEF DESCRIPTION OF THE DRAWINGS

This invention can be best understood by those having ordinary skill in the art by reference to the following detailed description, when considered in conjunction with the accompanying drawings in which.

DETAILED DESCRIPTION OF THE INVENTION

Figure 1:
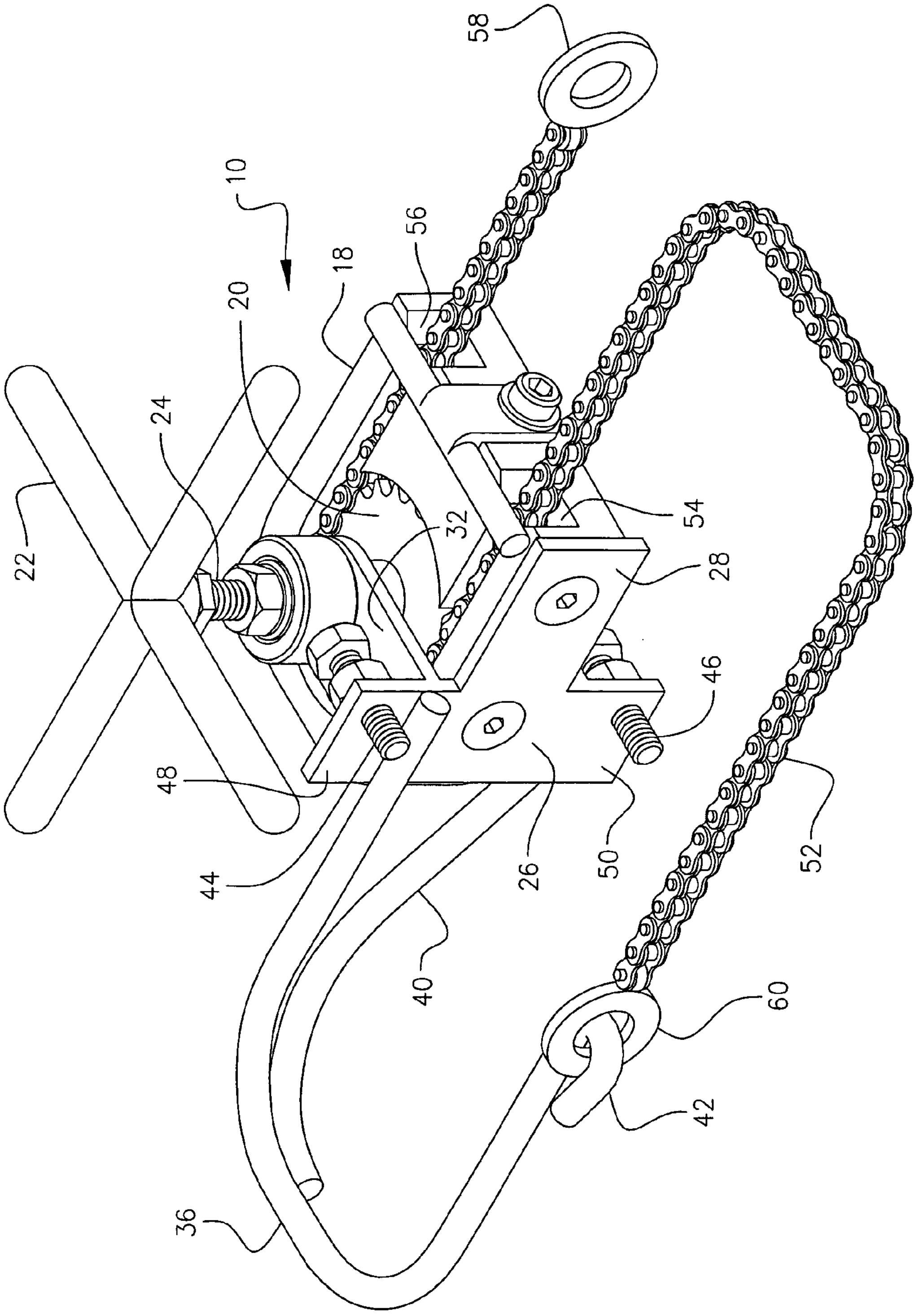
FIG. 1 is a perspective view of the attachment device of this invention.

Throughout the following detailed description, the same reference numerals refer to the same elements in all figures.

Figure 2:
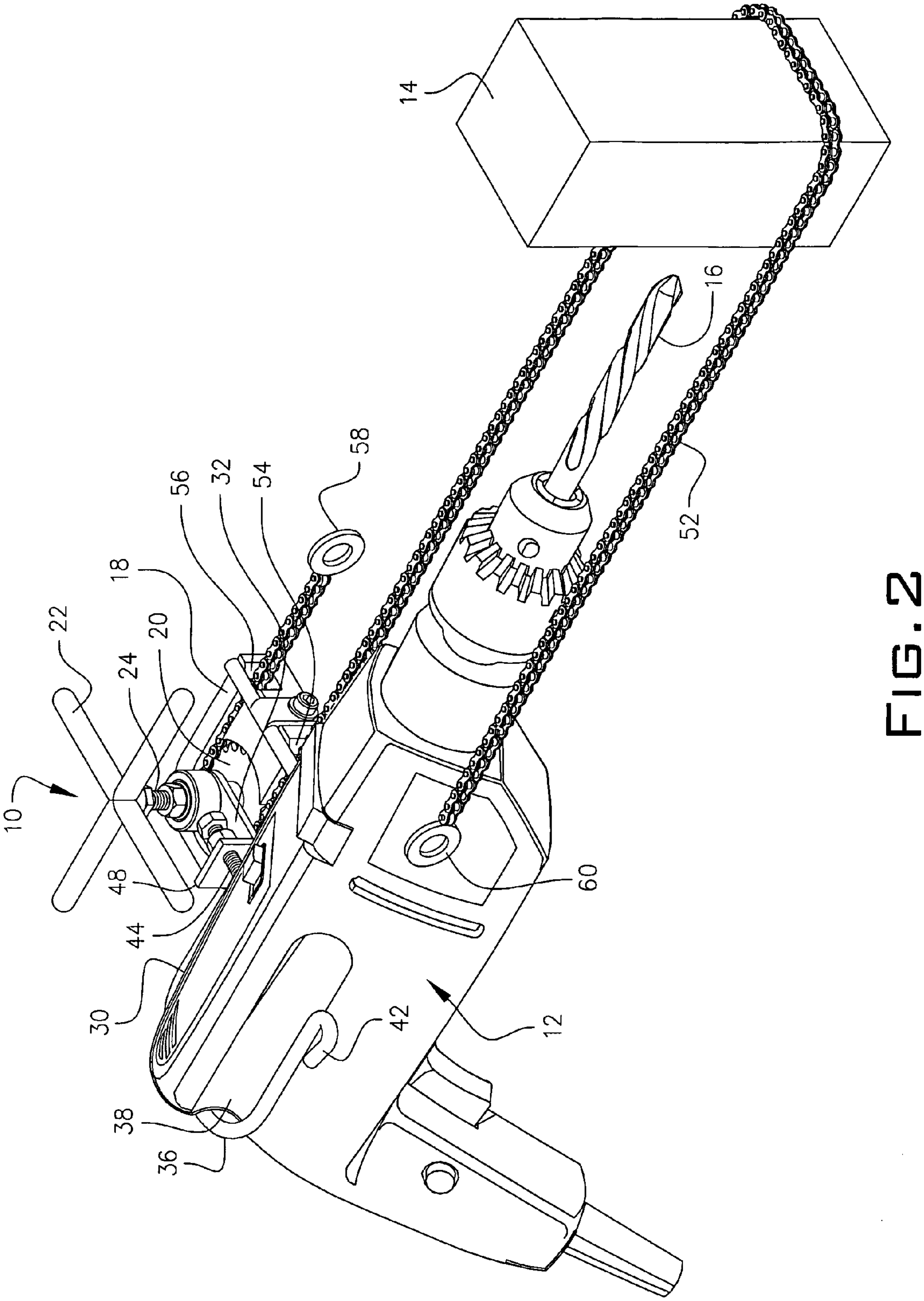
FIG. 2 is a perspective view of the attachment device of FIG. 1 attached to an electric drill and its chain looped around a post to be drilled.
Figure 3:
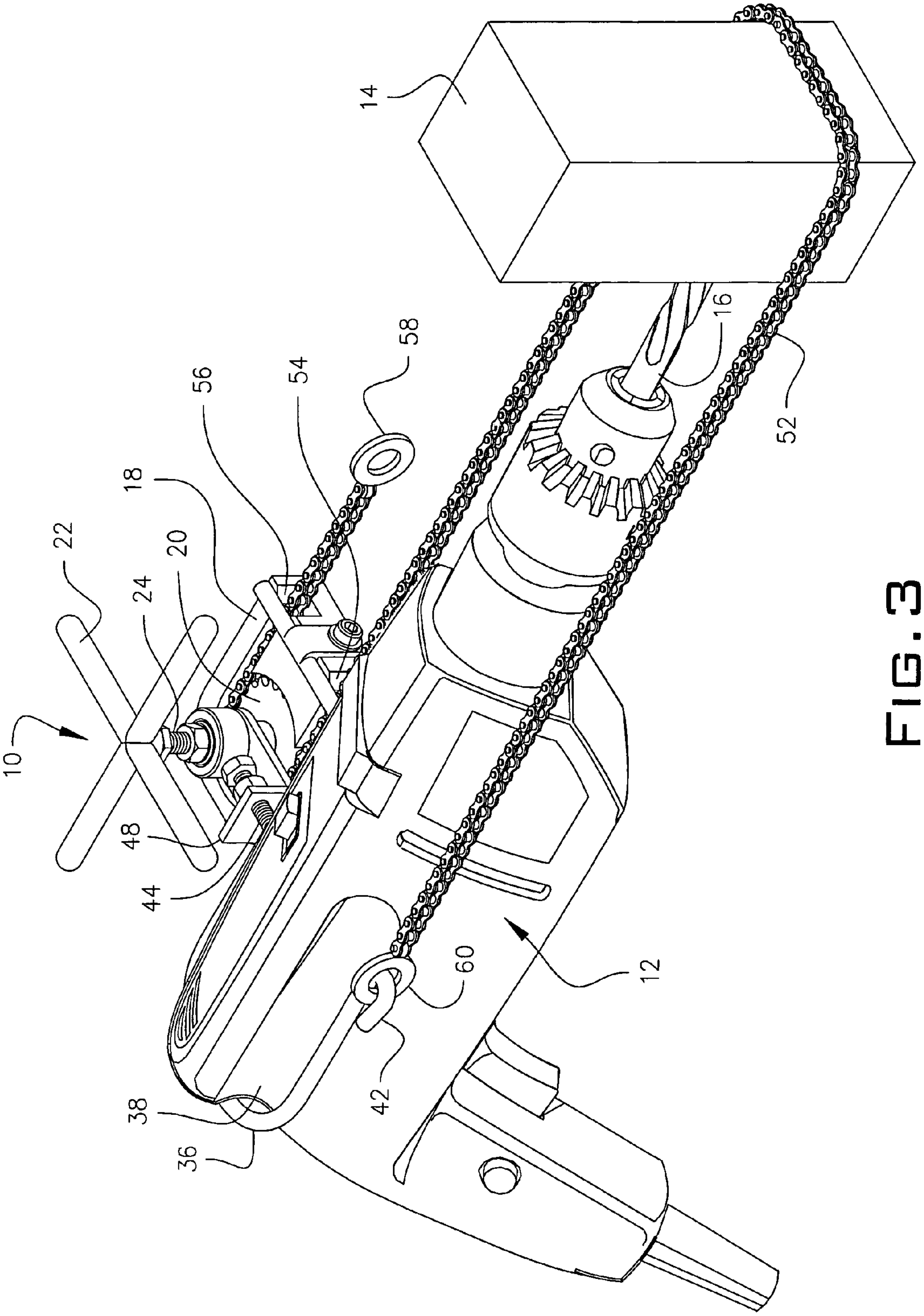
FIG. 3 is a perspective view of the attachment device and electric drill operating in conjunction with each other to drill a hole in a post.

Referring to FIGS. 1–3, the work saving apparatus 10 is attached around an electric drill 12 and a work post 14 in which an operator desires to make a hole using bit 16. The apparatus 10 has a housing 18 in which a sprocket wheel 20 turns by turning handle 22. Handle 22 is attached to a shaft 24 that turns sprocket wheel 20. A mounting bracket 26 has a T-shaped base 28 juxtaposed to a side surface 30 of the drill 12. A pair of arms 32 and 34 project outwardly from the T-shaped base 28. The arms 32 and 34 each have bores at their ends distal from the T-shaped base 28. Shaft 24 passes through both bores located at each side of the sprocket 20. End caps 62 receive the ends of shaft 24.

A U-shaped flexible wire rod 36 extends rearwardly from the T-shaped base 28 and tightly surrounds a rear portion 38 of drill 12. The wire rod 36 is welded to the T-shaped base 28. A second supporting wire rod 40 also is welded to the T-shaped base 28 and is welded to wire rod 36. An end of wire rod 36 has a J-hook 42. Screws 44 and 46 pass through threaded bores at each lateral end 48 and 50 respectively of the T-shaped base 28. The ends of the screws 44 and 46 engage the side 30 of the electric drill to stabilize the attachment with respect to the drill.

Chain 52 engages the teeth of sprocket wheel 20 and exits through openings 54 and 56 in housing 18. A first end of chain 52 is attached to a stop 58 which is larger than opening 56. The chain 52 is placed around the work piece 14 and a second end of chain 52 is attached by a ring 60 to the J-hook 42.

The drill bit 16 is placed over the spot to be drilled on the work piece 14 (FIG. 2) and then handle 22 is turned to tighten the chain 52. The support provided by attachment 10 reduces the force by the drill operator necessary to penetrate the work piece 14.

The drill can be either powered by batteries or connected to a 120 A.C. power cord.

Figure 4:
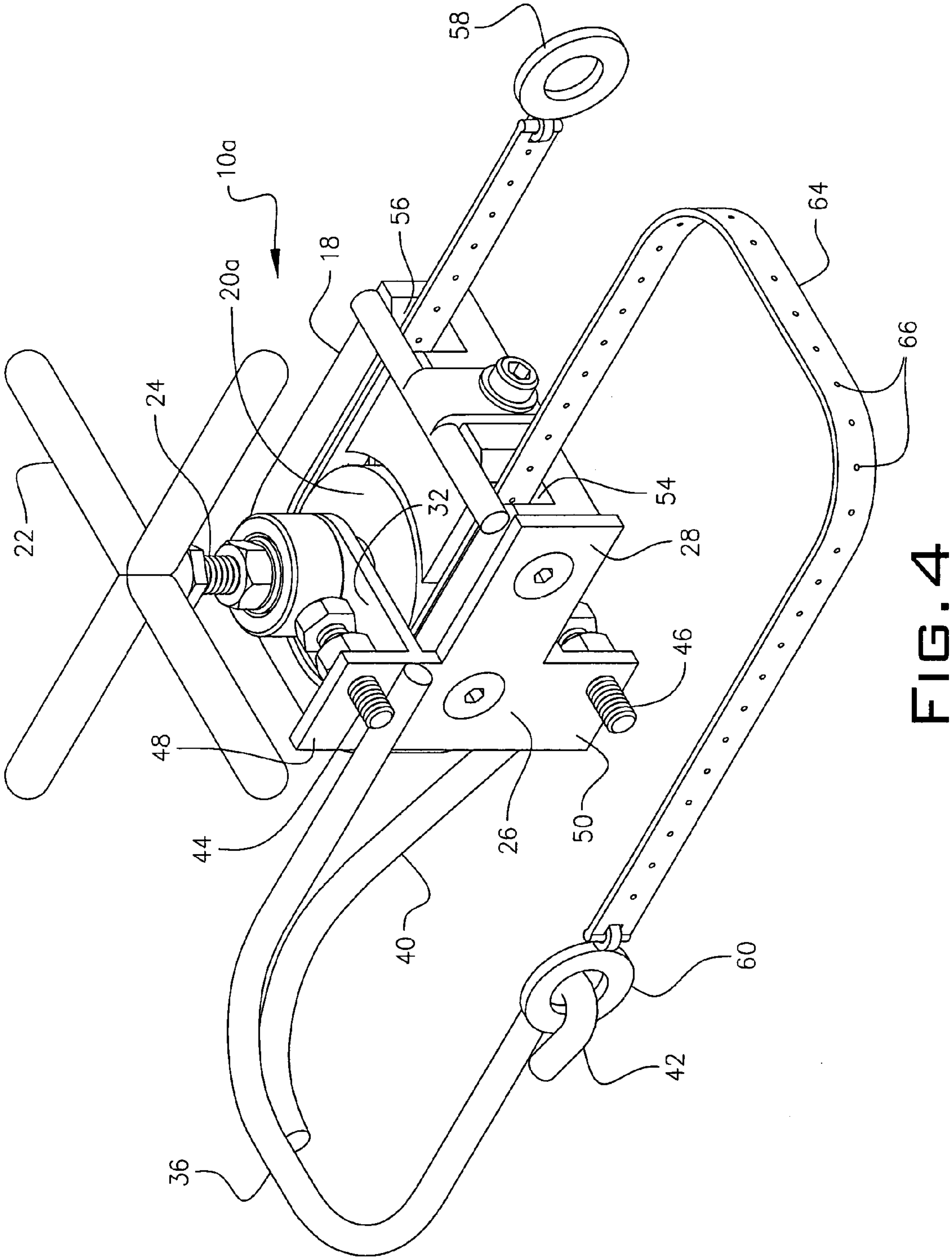
FIG. 4 is a perspective view of an alternative attachment device.
Figure 5:
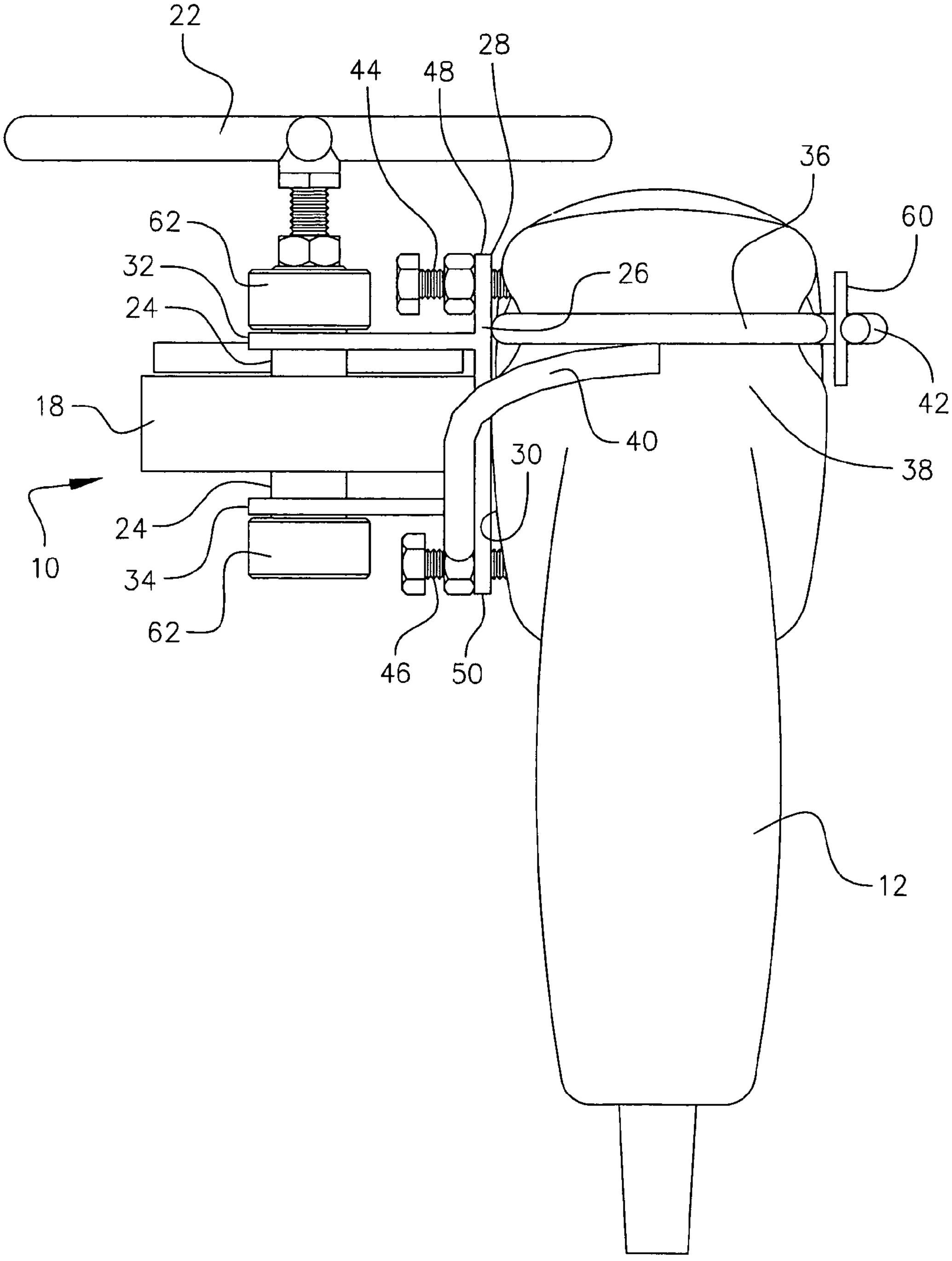
FIG. 5 is a rear elevational view of the attachment device and drill of FIG. 2.

An alternative to chain 52 is seen in FIG. 4 wherein a belt 64 is substituted for the chain. Holes 66 in the belt 64 are engaged by finer teeth on the sprocket wheel 20A in attachment 10A.

Equivalent elements can be substituted for elements in the attachment device to create substantially the same function in substantially the same way with substantially the same result.

Having thus described the invention, what is claimed for Letters Patent follows:

1. An apparatus attached to an electric drill for supporting the drill relative to a work piece, the apparatus comprising:

a) a housing attached at a side surface to a T-bracket, the housing enclosing a sprocket, a shaft vertically descending through the housing and axially attached to the sprocket, a handle attached to an upper end of the shaft for turning the shaft and the sprocket;

b) a pair of spaced apart arms extending outwardly from the T-bracket, and an end portion of each arm having a bore for receipt of the shaft, the sprocket positioned between the two arms;

c) a top portion of the T-bracket having projecting elements juxtaposed to an outer surface of the electric drill for supporting the apparatus juxtaposed to the drill;

d) a first flexible metal rod juxtaposed around a rear portion of the electric drill, a first end of the rod attached to the T-bracket and a second end attached to a connector on a side of the drill opposite from the T-bracket; and e) a chain engaged to the sprocket at one end and adapted to be looped around the work piece at a second end, the second end of the chain attached to the connector at the second end of the metal rod.

2. The apparatus attached to an electric drill according to claim 1, wherein the second end of the metal rod contains a J-hook which connects to a connecting fixture at the second end of the chain.

3. The apparatus attached to an electric drill according to claim 2, wherein the connecting fixture at the second end of the chain is doughnut shaped.

4. The apparatus attached to an electric drill according to claim 1, wherein the first end of the first flexible metal rod is welded to the T-bracket.

5. The apparatus attached to an electric drill according to claim 1, wherein a pair of openings on a side surface of the housing provide an entrance and exit respectfully from the sprocket.

6. The apparatus attached to an electric drill according to claim 4, wherein a second metal rod is welded at one end to a portion of the T-bracket and at the other end to the first metal rod.

7. An apparatus attached to an electric drill for supporting the drill relative to a work piece, the apparatus comprising:

(a) a T-bracket attached to a first end of a first flexible wire rod, the wire rod adapted to be tightly mounted around a rear portion of the drill, a second end of the wire rod having a connecting element located along a side of the drill opposite from the T-bracket, a pair of spaced apart arms extending from the T-bracket outwardly from the drill, an end portion of each arm distal from the T-bracket having a through bore;

(b) a shaft turned by a handle, the shaft connected to a sprocket wheel, the shaft passing through the bore at the end of each arm, the sprocket wheel positioned in a housing between the two arms;

(c) a side surface of the housing attached to a base portion of the T-bracket; and (d) a means for engaging the sprocket wheel passing through a first opening in the housing and exiting out a second opening in the housing.

8. The apparatus attached to an electric drill according to claim 7, wherein the T-bracket is welded to the first end of the first flexible wire rod.

9. The apparatus attached to an electric drill according to claim 8, wherein a second flexible wire rod is welded to the T-bracket at a first end and to the first flexible wire rod at a second end.

10. The apparatus attached to an electric drill according to claim 7, wherein the second end of the first wire rod is in the form of a J-hook.

11. The apparatus attached to an electric drill according to claim 7, wherein the means for engaging the sprocket wheel is a linked chain.

12. The apparatus attached to an electric drill according to claim 7, wherein the means for engaging the sprocket wheel is a belt having multiple equally spaced apart holes for engaging teeth on the sprocket wheel.

13. A method of attaching an apparatus to an electric drill to reduce the fatigue of an operator employing the electric drill, the method comprising;

a) providing an electric drill and an attached bit for drilling holes;

b) providing an apparatus juxtaposed to a back portion of the drill, on a first and second side of the drill, the apparatus having a T-bracket;

c) welding a first end of a first flexible wire rod to the T-bracket;

d) extending the flexible wire rod closely around the back portion of the electric drill and forming the second end into a J-hook shape, on a side of the electric drill opposite from the T-bracket;

e) providing a pair of spaced apart arms extending from the T-bracket outwardly;

f) drilling a hole in an end portion of each arm distal from the T-bracket;

g) providing a sprocket wheel mounted within a housing between the two arms;

h) passing a shaft having a handle at one end through the holes in the two arms and through the center of the sprocket wheel and adapting the shaft to turn the sprocket wheel;

i) providing a linked chain around the sprocket wheel and a pair of openings in the housing for the chain to pass through; and j) looping the chain around a work piece and attaching an end of the chain to the J-hook, and turning the handle so that the chain is tightly around the work piece so that the drill operator exerts a lesser pressure on the drill bit than employing a drill without the apparatus.

14. The method of attaching an apparatus to an electric drill according to claim 13, wherein a second flexible metal rod is welded at one end to the T-bracket and at a second end to the first flexible wire rod.

* * * * *